United States Patent [19]

Obara

[11] Patent Number: 4,963,711
[45] Date of Patent: Oct. 16, 1990

[54] ELECTRIC DISCHARGE POSITION DETECTING DEVICE OF A WIRE ELECTRIC DISCHARGE MACHINE

[75] Inventor: Haruki Obara, Toyama, Japan

[73] Assignee: Fanuc Ltd., Minamitsuru, Japan

[21] Appl. No.: 362,383

[22] PCT Filed: Oct. 29, 1988

[86] PCT No.: PCT/JP88/01108

§ 371 Date: May 5, 1989

§ 102(e) Date: May 5, 1989

[87] PCT Pub. No.: WO89/04232

PCT Pub. Date: May 18, 1989

[30] Foreign Application Priority Data

Oct. 31, 1987 [JP] Japan .................. 62-274659

[51] Int. Cl.⁵ .................................. B23H 7/04
[52] U.S. Cl. ........................ 219/69.12; 219/69.13
[58] Field of Search ................... 219/69.12, 69.13

[56] References Cited

U.S. PATENT DOCUMENTS 4,329,558  5/1982  Martin ................. 219/69.12
4,575,605  3/1986  Martin ................. 219/69.12

FOREIGN PATENT DOCUMENTS 53-64899   6/1978  Japan .
61-288931 12/1986  Japan ................. 219/69.13
62-15017   1/1987  Japan .
62-44316   2/1987  Japan ................. 219/69.13
62-54626   3/1987  Japan ................. 219/69.13

Primary Examiner—A. D. Pellinen
Assistant Examiner—Geoffrey S. Evans
Attorney, Agent, or Firm—Staas & Halsey

[57] ABSTRACT

An electric discharge position detecting device of a wire electric discharge machine which is capable of accurately detecting an electric discharge position with use of a relatively simple arrangement. In a divider (13), an output voltage from a differential amplifier (11), corresponding to the difference between output voltages of coils (9, 10), indicative of the differentials of discharge currents flowing individually through upper and lower conductors (4, 5), is divided by an output voltage of an adder (13), indicative of the differential of the total discharge current, and a voltage indicative of the electric discharge position is delivered from the divider. Each time a machining pulse from an electric discharge machining power source (3) is applied to a machining gap, the divider output is sampled and held, and is then compared to the respective reference voltages of comparators (C1 to C3). If the electric discharge position does not make any substantial change when the next machining pulse is applied, a signal indicative of the occurrence of concentrated electric discharge is delivered from a NOR gate (16) connected to the comparators.

6 Claims, 3 Drawing Sheets

ELECTRIC DISCHARGE POSITION DETECTING DEVICE OF A WIRE ELECTRIC DISCHARGE MACHINE

BACKGROUND OF THE INVENTION

The present invention relates to a device for detecting an electric discharge position between a workpiece and a wire electrode in a wire electric discharge machine.

Generally known are various methods for detecting an electric discharge position in an electric discharge machining apparatus. These methods include a method (see Japanese Patent Disclosure No. 59-47124) in which the electric discharge machining position is detected by measuring the propagation time of pressure waves produced when electric discharge is caused, a concentrated electric discharge detecting method (see Japanese Patent Disclosure No. 59-30620) in which whether the electric discharge position is concentrated on one point is determined in accordance with discharge current waveforms, and a method (see Japanese Patent Disclosure No. 53-64899) in which the electric discharge position is detected by detecting the variation of an electric resistance between a point of electric power supply to a wire electrode and an electric discharge point.

SUMMARY OF THE INVENTION

The object of the present invention is to provide an electric discharge position detecting device of a wire electric discharge machine, capable of accurately detecting an electric discharge position with a relatively simple arrangement, based on a novel principle of operation.

In order to achieve the above object, according to the present invention, an electric discharge position detecting device used in a wire electric discharge machine, in which an electric current is supplied from an electric discharge machining power source to a wire electrode through first and second conductors located above and below a workpiece, respectively, comprises: first and second detecting means for detecting the differentials of electric currents flowing through the first and second conductors, respectively; and third detecting means for detecting the difference between output signals from the two detecting means to generate an output signal indicative of an electric discharge position.

According to the present invention, as described above, the electric discharge position is always detected during electric discharge machining, in accordance with the difference between the differentials of the electric currents flowing through the conductors located above and below the workpiece, individually. Accordingly, the electric discharge position can be detected with a relatively simple arrangement, and the occurrence of concentrated electric discharge can be easily discriminated. Thus, the wire electric discharge machine can be controlled to prevent the wire electrode from being broken by concentrated electric discharge.

DESCRIPTION OF THE PREFERRED EMBODIMENT

Figure 1:
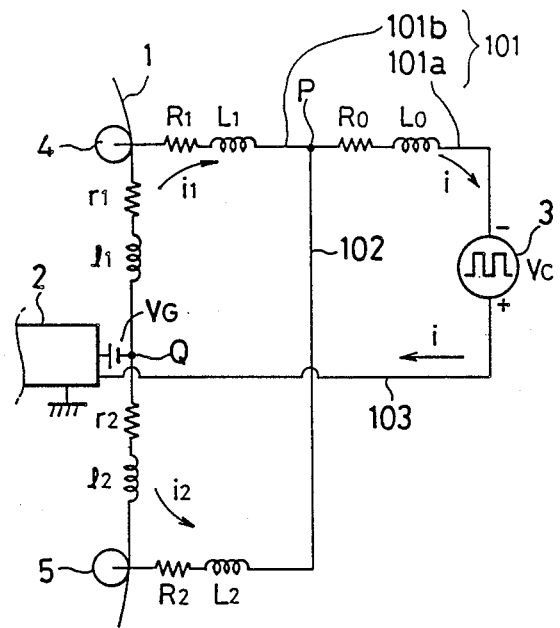
FIG. 1 is a schematic circuit diagram showing the principle of operation of an electric discharge position detecting device according to one embodiment of the present invention.
Figure 2:
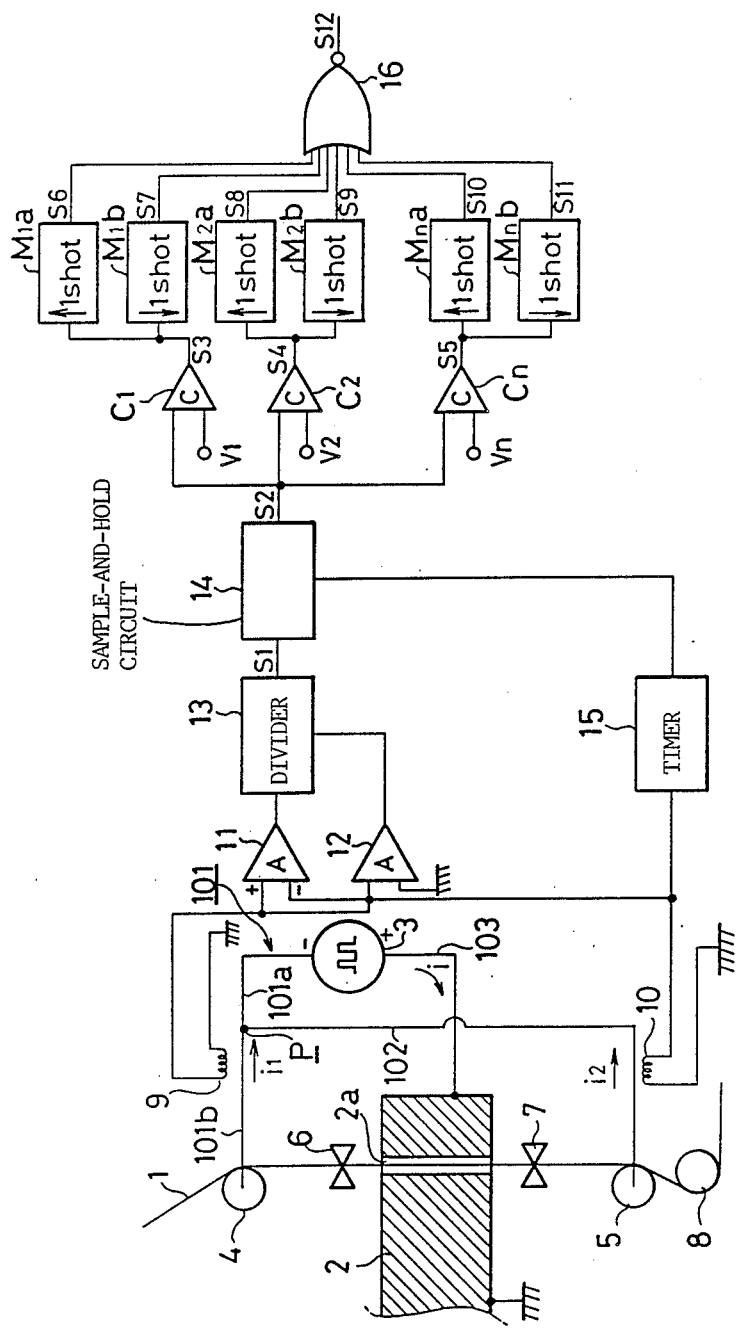
FIG. 2 is a block circuit diagram showing the electric discharge position detecting device and peripheral elements associated therewith.

In an electric discharge machining power source 3 for producing a machining pulse voltage, as shown in FIGS. 1 and 2, a negative output terminal is connected to an upper conductor 4 and a lower conductor 5 by means of a first lead wire 101 and a second lead wire 102, respectively, one end of the second lead wire 102 being connected to the terminal end of a first section 101a of the first lead wire at a junction P, while a positive output terminal is connected to a workpiece 2 by means of a third lead wire 103. Both conductors 4 and 5 are guided by wire guides 6 and 7 and a guide roller 8, and are in contact with a wire electrode 1 which penetrates a groove or hole 2a formed in the workpiece 2. First and second coils 9 and 10 for detecting discharge currents i1 and i2 flowing through the conductors 4 and 5, respectively, are arranged facing the first and second lead wires 101 and 102, respectively. One end of the first coil 9, the other end of which is grounded, is connected to a non-inverting input terminal of a differential amplifier 11 and the input terminal of an adder 12. On the other hand, one end of the second coil 10, the other end of which is grounded, is connected to an inverting input terminal of the differential amplifier 11, the input terminal of the adder 10, and a trigger input terminal of a timer 15. The output terminal of a divider 13, two input terminals of which are connected individually to the respective output terminals of the differential amplifier 11 and the adder 12, is connected to a data input terminal of a sample-and-hold circuit 14 whose strobe signal input terminal is connected to the output terminal of the timer 15. The output terminal of the sample-and-hold circuit 14 is connected to the respective first input terminals of first to nth comparators C1 to Cn which are supplied, at second input terminals thereof, with reference voltages V1 to Vn (n=3 in the present embodiment; to be repeated in the following) of different levels, respectively. The output terminals of the first to nth comparators C1 to Cn are connected to trigger input terminals of first to nth pairs of one-shot multivibrators M1a and M1b to Mna and Mnb, respectively, whose output terminals are connected individually to the input terminal of a NOR gate 16.

The following is a description of reference symbol in FIG. 1. Symbol $V_G$ and $V_C$ designate the gap voltage between the wire electrode 1 and the workpiece 2 and the output pulse voltage of the machining power source 3, respectively. Symbols R0 and L0 designate the resistance value and stray inductance, respectively, of the first section 101a of the first lead wire, symbols R1 and L1 designate the resistance value and stray inductance, respectively, of a second section 101b of the first lead wire, and symbols R2 and L2 designate the resistance value and stray inductance, respectively, of the second lead wire 102. Symbols r1 and l1 designate the resistance value and stray inductance, respectively, of the wire electrode 1, covering the range from the upper conductor 4 to an electric discharge position Q, and symbols r2 and l2 designate the resistance value and stray inductance, respectively, of the wire guide 1, covering the range from the lower conductor 5 to the electric discharge position Q. Numeral i (=i1+i2) designates the total discharge current.

Referring now to FIG. 1, the principle of operation of the electric discharge machining position detecting device according to the present embodiment will be described.

The following equation holds for a closed circuit composed of the power source 3, workpiece 2, wire electrode 1, upper conductor 4, and power source 3.

$$V_C = R_0 i + L_0 \cdot di/dt + (R1+r1)i1 + (L1+l1)di1/dt + V_G \tag{1}$$

The following equation holds for a closed circuit composed of the power source 3, workpiece 2, wire electrode 1, lower conductor 5, and power source 3.

$$V_C = R_0 i + L_0 \cdot di/dt + (R2+r2)i2 + (L2+l2)di2/dt + V_G \tag{2}$$

From equations (1) and (2), we obtain $$(R1+r1)i1 + (L1+l1)di1/dt = (R2+r2)i2 + (L2+l2)di2/dt \tag{3}$$

The left and right sides of equation (3) individually represent the potential difference between the diverging point P and the electric discharge position Q. At the start of electric discharge, variations of the discharge currents i1 and i2 are substantial, while the current values are small. If the voltages across the individual resistances are neglected as very small values in equation (3), the following approximate equation holds.

$$(L1+l1)di1/dt = (L2+l2)di2/dt \tag{4}$$

Transforming equation (4), we obtain equations (5) and (6).

$$di1/dt = \{(L2+l2)/(L1+l1)\} \cdot di2/dt \tag{5}$$

$$di1/dt - di2/dt = \{(L2-L1+l2-l1)/(L1+l1)\} \cdot di2/dt \tag{6}$$

If the contribution of the resistances is neglected as aforesaid, the voltage between the diverging point P and the electric discharge position Q, connected to each other by means of a parallel circuit, is given by $$[\{(L1+l1)(L2+l2)\}/(L1+l1+L2+l2)] \cdot di/dt \tag{7}$$

If this is equal to both sides of equation (4), we obtain $$(L1+l1)di1/dt = (L2+l2)di2/dt = [\{(L1+l1)(L2+l2)\}/(L1+l1+L2+l2)] \cdot di/dt \tag{8}$$

Rearranging equation (8), we have $$\{1/(L1+l1)\} \cdot di2/dt = \{1/(L1+l1+L2+l2)\} \cdot di/dt \tag{9}$$

From equations (9) and (6), we obtain $$di1/dt - di2/dt = \{(L2-L1+l2-l1)/(L1+l1+L2+l2)\} \cdot di/dt \tag{10}$$

In equation (10), the respective stray inductances L1 and L2 of the second section 101b of the first lead wire and the second lead wire 102 and the stray inductance (l1+l2) of the wire electrode between the upper conductor 4 and the lower conductor 5 are constant despite the change of the electric discharge position Q. The time differential di/dt of the discharge current i changes depending on the gap voltage $V_G$ and the supply voltage $V_C$. Here, the supply voltage $V_C$ can be considered as being constant. If it is supposed that the gap voltage $V_G$ changes only slightly, the difference between the differential di1/dt of the current i1 flowing through the upper conductor 4, at the start of the electric discharge, and the differential di2/dt of the current i2 flowing through the lower conductor 5 is proportional to the difference between the stray inductance l2 between the lower conductor 5 and the electric discharge position Q and the stray inductance l1 between the upper conductor 4 and the electric discharge position Q. Thus, the value (di1/dt−di2/dt) varies depending on the electric discharge position Q.

As is evident from equation (10), moreover, the electric discharge position Q can be accurately expressed by using a value obtained by dividing (di1/dt−di2/dt) by di/dt.

The electric discharge position Q can be substantially detected on the basis of only the sign of (di1/dt−di2/dt) by establishing the relation L1=L2. That is, if we have l1=l2, i.e., if electric discharge occurs halfway (in the central position with respect to the thickness direction of the workpiece) between the upper and lower conductors 4 and 5, (di1/dt−di2/dt) is 0. If the electric discharge occurs at a position above the central position, the value (di1/dt−di2/dt) is positive. If the electric discharge occurs at a position below the central position, the value (di1/dt−di2/dt) is negative.

Figure 3:
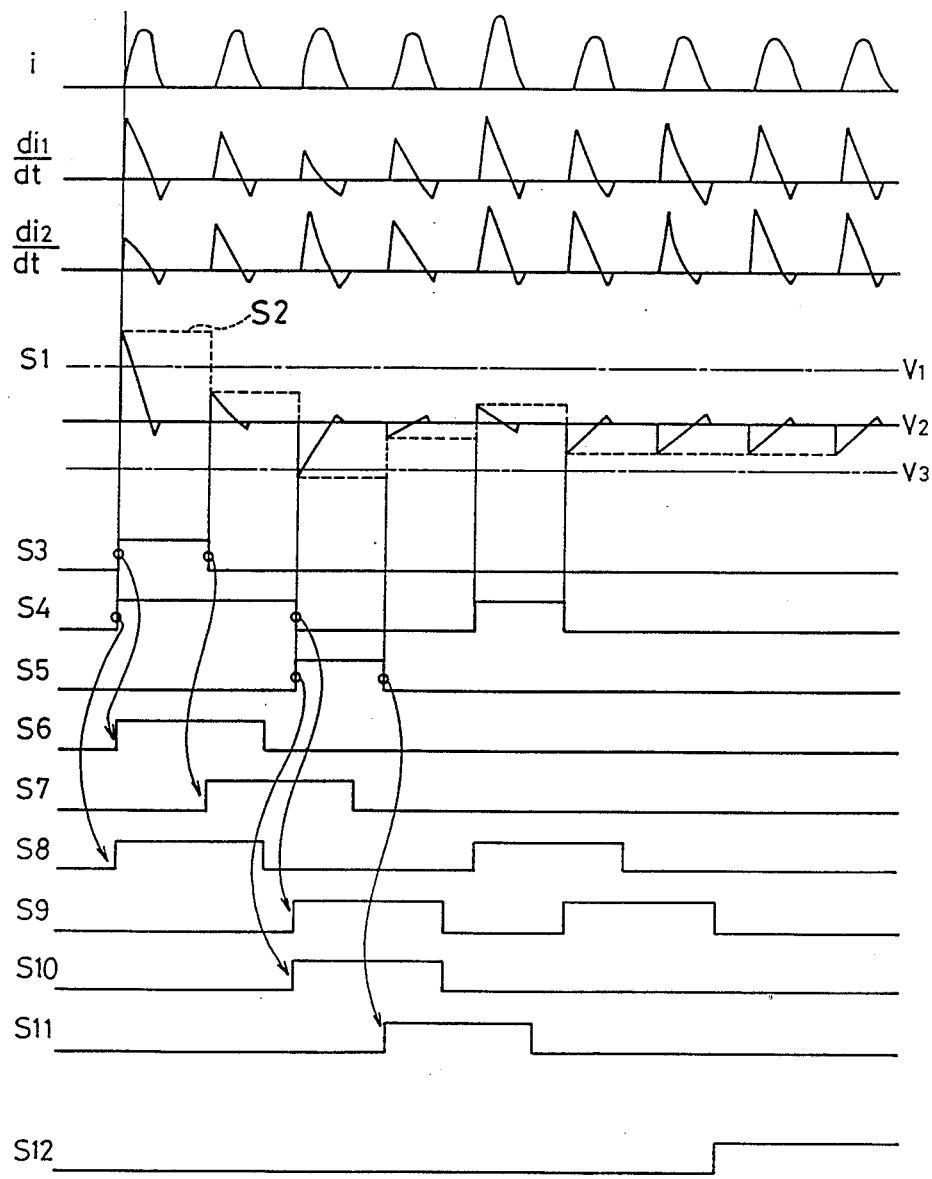
FIG. 3 is a timing chart showing signal waveforms at various parts of the electric discharge position detecting device.

Referring now to FIGS. 1 to 3, the operation of the electric discharge position detecting device will be described further in detail.

When the pulse voltage from the machining power source 3 is applied between the wire electrode 1 and the workpiece 2 so that electric discharge is caused, thus producing the flow of the discharge current i, as shown in FIG. 3, voltages induced in the coils 9 and 10 (FIG. 2), which are coupled electromagnetically to the first and second lead wires 101 and 102, respectively, and corresponding to the respective differentials di1/dt and di2/dt of the discharge currents i1 and i2 flowing through the upper and lower conductors 4 and 5, respectively, are applied from the coils 9 and 10 to the differential amplifier 11 and the adder 12, individually. The differential amplifier 11 outputs a voltage indicative of the difference (di1/dt−di2/dt) between the two differentials, while the adder 12 outputs a voltage indicative of the sum of the two differentials. This adder output represents the differential of the total discharge current i as follows:

$$di1/dt + di2/dt = d(i1+i2)/dt = di/dt \tag{11}$$

The outputs of the differential amplifier 11 and the adder 12 are applied individually to the divider 13, which divides the output of the differential amplifier 11 by the output of the adder 12, and delivers an output S1 given by $$S1 = (di1/dt - di2/dt)/(di/dt) \tag{12}$$

When the output of the coil 10 rises, that is, at the time of electric discharge, the timer 15 is triggered to produce a pulse with a predetermined pulse width. When the output pulse of the timer 15 is input, the sample-and-hold circuit 14 holds the output S1 of the divider 13 at the start of the electric discharge for the period during which one machining pulse is generated, and produces an output S2 (indicated by broken line in FIG. 3) given by $$S2 = (di1/dt - di2/dt)/(di/dt) \quad (13)$$

This output S2 of the sample-and-hold circuit 14 is applied to the comparators C1 to C3, and is compared to the reference voltages V1 to V3 of the comparators. Thereupon, if the output voltage S2 of the sample-and-hold circuit 14 is higher than the comparative voltage V1, an output S3 is delivered from the comparator C1. If the voltage S2 is higher than the reference voltage V2, an output S4 is delivered from the comparator C2. If the output voltage S2 of the sample-and-hold circuit is lower than the reference voltage V3, moreover, an output S5 is delivered from the comparator C3.

When the respective outputs of comparators C1 to C3 rise, the one-shot multivibrators M1a, M2a and M3a are triggered individually. When the comparator outputs fall, on the other hand, the multivibrators M1b to M3b are triggered individually to output pulses S6 to S11 with a predetermined pulse width. These output pulses S6 to S11 are supplied to a NOR gate 16.

As a result, if the variation of the output S2 of the sample-and-hold circuit 14, i.e., the variation of the value (l2−l1) corresponding to the electric discharge position Q, is not smaller than a predetermined value, an H-level output is delivered from at least one of the one-shot multivibrators M1a and M1b to M3a and M3b, and an output S12 of the NOR gate 16 is brought to an L-level which is indicative of the absence of concentrated electric discharge.

If concentrated electric discharge is caused so that the variation of the output S2 of the sample-and-hold circuit 14 is smaller than the predetermined value, on the other hand, the outputs of all the one-shot multivibrators M1a and M1b to M3a and M3b are brought to the L-level, while the output S12 of the NOR gate 16 is brought to an H-level which is indicative of the occurrence of concentrated electric discharge.

When the H-level signal S12 is delivered from the NOR gate 16, any of such parameters as the on-off ratio, voltage, and current of the output pulses from the machining power source 3, the fluid pressure of a machining fluid, the tension of the wire electrode 1, etc., are controlled to cancel the concentrated electric discharge.

In the embodiment described above, preferably, the one-shot multivibrators M1a and M1b to M3a and M3b are designed so that their output pulse width can be set to any desired value, and they are of re-triggerable type. Moreover, timers based on a time constant circuit or other timers may be used in place of the one-shot multivibrators.

In the aforementioned embodiment, furthermore, the one-shot multivibrators are of a type triggerable when the outputs of the comparators rise and fall are provided. Alternatively, however, the one-shot multivibrators (timers) may be of a type triggerable only when the comparator outputs rise or fall. In short, it is necessary only that the number of comparators, the number of one-shot multivibrators (timers), and the output pulse width be selected so that the H-level output is delivered from the NOR gate 16 only when concentrated electric discharge is caused.

Also, window comparators may be used as the aforesaid comparators. Further, the output of the sample-and-hold circuit may be applied to the individual comparators after being smoothed.

Instead of using the adder 12, furthermore, a coil opposed to the third lead wire 103 may be used to detect the differential of the total discharge current.

I claim:

1. An electric discharge position detecting device for a wire electric discharge machine in which an electric current is supplied form an electric discharge machining power source to a wire electrode through first and second conductors located above and below a workpiece, respectively, said electric discharge position detecting device comprising:

first and second detecting means for detecting the differentials of electric currents flowing through said first and second conductors, respectively; and third detecting means for detecting the difference between output signals from said first and second detecting means to generate an output signal indicative of an electric discharge position, said third detecting means including:

a divider, operatively connected to said first and second detecting means, for dividing the difference between the output signals of said first and second detecting means by the differential of a total discharge current; and a circuit, operatively connected to said divider, for sampling and holding an output of said divider at the start of electric discharge; and fourth detecting means for detecting a change in the output signal from said third detecting means, said fourth detecting means including:

a plurality of comparators, each of said plurality of comparators connected to receive a different reference voltage, for comparing the output from said third detecting means to each respective reference voltage and outputting respective output signals; and a plurality of timers, operatively connected to said plurality of comparators, triggered in response to at least one of the leading and trailing edges of the respective output signals from corresponding ones of said plurality of comparators, thereby producing outputs for a predetermined period of time.

2. An electric discharge position detecting device according to claim 1, wherein each of said first and second detecting means includes a coil opposed to a lead wire connecting said electric discharge machining power source and a corresponding one of said two conductors.

3. An electric discharge position detecting device according to claim 1, wherein said first detecting means is a differential amplifier and said second detecting means is an adder.

4. An electric discharge position detecting device for a wire electric discharge machine having an electric current supplied from an electric discharge machining power source to a wire electrode to first and second conductors located above and below a workpiece, respectively, said electric discharge position detecting device comprising:

first and second detecting means for detecting differentials of the electric currents flowing through the first and second conductors, respectively, each of said first and second detecting means including:

a coil opposed to a lead wire connecting said electric discharge machining power source and a corresponding one of the first and second conductors;

a differential amplifier connected to said coil connected to the first conductor; and an adder connected to said coil connected to the second conductor;

third detecting means for detecting differences between output signals from said first and second detecting means and generating an output signal indicative of an electric discharge position, said third detecting means including:

a divider, connected to said differential amplifier and said adder, for dividing the difference between the output signals from said differential amplifier and said adder by a differential of a total discharge current; and a sample and hold circuit, connected to said divider, for holding an output of said divider at the start of electric discharge;

fourth detecting means, connected to said sample and hold circuit, for detecting a change of the output signal from said sample and hold circuit, said fourth detecting means including:

a plurality of comparators, connected to said sample and hold circuit, for comparing the output from said sample and hold circuit to respective reference voltages; and a plurality of timers, respectively connected to said plurality of comparators, triggered in response to at least one of a leading and trailing edge of outputs from said plurality of comparators, for producing outputs for a predetermined period of time; and a logic circuit, connected to said timers, for receiving the outputs from said timers and outputting a signal indicating the occurrence or non-occurrence of concentrated electric discharge.

5. An electric discharge position detecting device according to claim 4, wherein each of said plurality of comparators have a first terminal which receives respective different reference voltages and a second terminal which receives the output from said sample and hold circuit.

6. An electric discharge position detecting device according to claim 5, wherein each of said timers comprise a plurality of pairs of one-shot multivibrators connected to said comparators, and wherein said output from each of said comparators is input to a respective one of said pairs of one-shot multivibrators.

* * * * *

UNITED STATES PATENT AND TRADEMARK OFFICE
CERTIFICATE OF CORRECTION

PATENT NO. : 4,963,711

DATED : OCTOBER 16, 1990

INVENTOR(S) : HARUKI OBARA

It is certified that error appears in the above-identified patent and that said Letters Patent is hereby corrected as shown below:

Col. 3, (Equation 7), "[55" should be --[{--.

Signed and Sealed this

Seventeenth Day of March, 1992

*Attest:*

HARRY F. MANBECK, JR.

*Attesting Officer*      *Commissioner of Patents and Trademarks*